United States Patent
Sugiura et al.

(10) Patent No.: US 7,464,625 B2
(45) Date of Patent: Dec. 16, 2008

(54) APPARATUS FOR OPENING AND CLOSING A DOOR OF A CONTAINER APPARATUS OF A VEHICLE

(75) Inventors: Keizo Sugiura, Toyota (JP); Seiji Isomura, Toyota (JP); Yoichi Yamamoto, Okazaki (JP); Hitoshi Suga, Nagoya (JP); Kazumi Sugesawa, Kariya (JP)

(73) Assignee: Kojima Press Industry Co., Ltd., Toyota-shi (JP)

( * ) Notice: Subject to any disclaimer, the term of this patent is extended or adjusted under 35 U.S.C. 154(b) by 17 days.

(21) Appl. No.: 11/797,284

(22) Filed: May 2, 2007

(65) Prior Publication Data

US 2007/0261512 A1    Nov. 15, 2007

(30) Foreign Application Priority Data

May 15, 2006   (JP) .............................. 2006-135487

(51) Int. Cl.
 *E05B 65/32* (2006.01)
(52) U.S. Cl. ..................................... 74/527; 292/336.3
(58) Field of Classification Search .................. 74/503, 74/504, 527, 567; 292/336.3, 337, 215; 70/208
See application file for complete search history.

(56) References Cited

U.S. PATENT DOCUMENTS 3,649,061 A * 3/1972 Meyer ..................... 292/336.3
6,141,914 A * 11/2000 Feige et al. ................... 49/503
7,055,874 B1 * 6/2006 Jeffries et al. ............... 292/337
7,296,829 B2 * 11/2007 Baser ......................... 292/165

FOREIGN PATENT DOCUMENTS

JP    2002-362237 A    12/2002

* cited by examiner

*Primary Examiner*—Chong H Kim
(74) *Attorney, Agent, or Firm*—Kenyon & Kenyon LLP

(57) ABSTRACT

An apparatus for opening and closing a door of a container apparatus of a vehicle can include a single knob, a shaft, a fixed member, a shaft biasing spring, an arm, and a cam. The shaft is movable in an axial direction of the shaft and rotatable about an axis of the shaft. The shaft has a radially extending portion. The shaft has first, second, and third rotational positions. The third rotational position is offset by 180 degrees from the first rotational position. The arm has an opening side arm corresponding to the first rotational position and a closing side arm corresponding to the third rotational position. A cam driving protrusion for rotating the cam is provided to at least one of the opening side arm and the closing side arm. A support member may be coupled to the arm. The support member includes an opening side support member and a closing side support member. Each of the opening side support member and the closing side support member has a recess formed therein for preventing the radially extending portion from interfering with the opening side support member or the closing side support member when the shaft rotates from the second rotational position to the third rotational position.

7 Claims, 6 Drawing Sheets

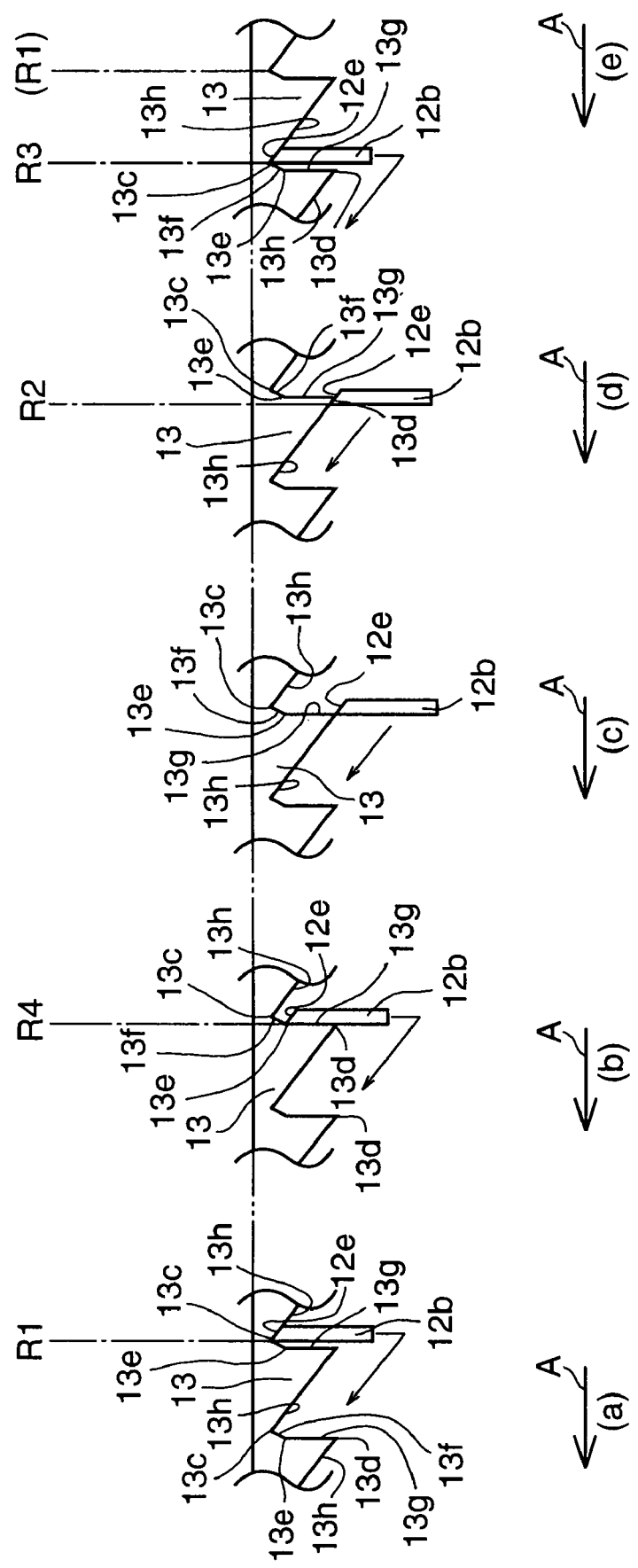

APPARATUS FOR OPENING AND CLOSING A DOOR OF A CONTAINER APPARATUS OF A VEHICLE

BACKGROUND

1. Technical Field

The present invention relates to an apparatus for opening and closing a door of a container apparatus of a vehicle.

2. Description of Related Art

Japanese Patent Publication 2002-362237 discloses an opening and closing apparatus for a door of a container apparatus of a vehicle having two knobs. The two knobs include an opening knob for opening the door and a closing knob for closing the door.

The opening and closing apparatus of the above publication has the following drawbacks:

First, the two knobs can be seen from an interior of the vehicle, which may degrade the appearance of the container.

Second, since two knobs are provided, when driving, it may be difficult for a driver to handle one of the knobs without looking at the other knob.

BRIEF DESCRIPTION

A problem to be addressed by some embodiments of the present invention is that presently two knobs (i.e., one is for opening the door and the other is for closing the door) are required to be provided in the conventional opening and closing apparatus of a door of a container apparatus.

In accordance with certain embodiments of the present invention an apparatus for opening and closing a door of a container apparatus of a vehicle may be provided which can open and close the door by operating a single knob.

Certain embodiments of the present invention operate using a single knob as follows:

(1) An apparatus for opening and closing a door of a container apparatus of a vehicle according to certain embodiments of the present invention may include a single knob, a shaft having an axial direction and an axis, a fixed member, a shaft biasing spring, an arm and a cam.

(a) The knob is disposed so as to oppose a first axial end of the shaft and is supported by the fixed member so as to be movable in the axial direction of the shaft relative to the fixed member. The knob includes a first cam surface.

(b) The shaft is supported by the fixed member so as to be movable in the axial direction of the shaft and rotatable about the axis of the shaft relative to the fixed member. The shaft has a first rotational position, a second rotational position and a third rotational position. The shaft has a radial direction perpendicular to the axial direction of the shaft and has a radially extending portion extending in the radial direction of the shaft. The shaft includes a second cam surface and a third cam surface. The second cam surface is capable of slidably contacting the first cam surface of the knob.

(c) The fixed member includes a fourth cam surface capable of slidably contacting the third cam surface of the shaft.

(d) The shaft biasing spring is disposed at a second axial end of the shaft. The shaft biasing spring biases the shaft in a direction opposite a direction in which the knob pushes the shaft.

(d-1) When the knob pushes the shaft, the first cam surface of the knob is moved into slidable contact with the second cam surface of the shaft and the knob rotates the shaft from the first rotational position to the second rotational position.

(d-2) When pushing on the shaft by the knob is released, the third cam surface of the shaft is pushed by the shaft biasing spring against the fourth cam surface of the fixed member and the shaft biasing spring further rotates the shaft from the second rotational position to the third rotational position.

(d-3) The third rotational position is a first rotational position of a successive shaft rotation.

(e) The arm has an arm rotational axis extending in a direction perpendicular to the axial direction of the shaft and is supported by the fixed member so as to be rotatable about the arm rotational axis. The arm includes an opening side arm and a closing side arm.

(e-1) When the shaft is positioned at one rotational position of the first rotational position and the third rotation position, the opening side arm is positioned at a position corresponding to the radially extending portion of the shaft in the axial direction of the shaft.

(e-2) When the shaft is positioned at the other rotational position of the first rotational position and the third rotation position, the closing side arm is positioned at a position corresponding to the radially extending portion of the shaft in the axial direction of the shaft.

(e-3) When the shaft is positioned at the one rotational position and when the shaft is moved in the axial direction by being pushed by the knob, the opening side arm is pushed by the radially extending portion to rotate relative to the fixed member.

(e-4) When the shaft is positioned at the other rotational position and when the shaft is moved in the axial direction by being pushed by the knob, the closing side arm is pushed by the radially extending portion to rotate relative to the fixed member.

(e-5) At least one of the opening side arm and the closing side arm has a cam driving protrusion formed therein. When the at least one of the opening side arm and the closing side arm is pushed by the shaft, the cam driving protrusion rotates together with the at least one of the opening side arm and the closing side arm and is moved into contact with the cam to drive the cam.

(f) The cam has a cam rotational axis extending in parallel with the arm rotational axis. The cam is supported by the fixed member so as to be rotatable in opposite rotational directions about the cam rotational axis. The cam is operatively coupled to the door of the container apparatus such that rotations of the cam in the opposite rotational directions correspond to opening and closing of the door.

Other embodiments of the present invention operate using a single knob as follows:

(2) An apparatus for opening and closing a door of a container apparatus of a vehicle according to certain embodiments of the present invention includes a single knob, a shaft having an axial direction and an axis, a fixed member, a shaft biasing spring, an arm and a cam.

(a) The knob is supported by the fixed member so as to be movable in the axial direction of the shaft relative to the fixed member.

(b) The shaft is supported by the fixed member so as to be movable in the axial direction of the shaft and rotatable about the axis of the shaft relative to the fixed member. The shaft has a first rotational position, a second rotational position and a third rotational position. The shaft has a radially extending portion extending in a radial direction of the shaft perpendicular to the axial direction of the shaft.

(d) The shaft biasing spring biases the shaft in a direction opposite a direction in which the knob pushes the shaft.

(d-1) When the knob pushes the shaft, the knob rotates the shaft from the first rotational position to the second rotational position.

(d-2) When pushing of the shaft by the knob is released, the shaft biasing spring rotates the shaft from the second rotational position to the third rotational position.

(d-3) The third rotational position is a first rotational position of a successive shaft rotation.

(e) The arm has an arm rotational axis extending in a direction perpendicular to the axial direction of the shaft and is supported by the fixed member so as to be rotatable about the arm rotational axis. The arm includes an opening side arm and a closing side arm.

(e-1) When the shaft is positioned at one rotational position of the first rotational position and the third rotation position, the opening side arm is positioned at a position corresponding to the radially extending portion of the shaft in the axial direction of the shaft.

(e-2) When the shaft is positioned at the other rotational position of the first rotational position and the third rotation position, the closing side arm is positioned at a position corresponding to the radially extending portion of the shaft in the axial direction of the shaft.

(e-3) When the shaft is positioned at the one rotational position and when the shaft is moved in the axial direction by being pushed by the knob, the opening side arm is pushed by the radially extending portion to rotate relative to the fixed member.

(e-4) When the shaft is positioned at the other rotational position and when the shaft is moved in the axial direction by being pushed by the knob, the closing side arm is pushed by the radially extending portion to rotate relative to the fixed member.

(e-5) At least one of the opening side arm and the closing side arm has a cam driving protrusion formed therein. When the at least one of the opening side arm and the closing side arm is pushed by the shaft, the cam driving protrusion rotates together with the at least one of the opening side arm and the closing side arm and is moved into contact with the cam to drive the cam.

(f) The cam has a cam rotational axis extending in parallel with the arm rotational axis. The cam is supported by the fixed member so as to be rotatable in opposite rotational directions about the cam rotational axis. The cam is operatively coupled to the door of the container apparatus such that rotations of the cam in the opposite rotational directions correspond to opening and closing of the door.

Still other embodiments of the present invention operate using a single knob as follows:

(3) An apparatus for opening and closing a door according to item (1) above further comprises a support member.

The support member includes an opening side support member and a closing side support member. The opening side support member is rotatably coupled to the opening side arm and the closing side support member is rotatably coupled to the closing side arm. When the shaft is pushed by the knob and is rotated from the first rotational position to the second rotational position, either one of the opening side support member and the closing side support member, which is located so as to correspond to the radially extending portion of the shaft in the axial direction of the shaft, is pushed by the radially extending portion of the shaft in the axial direction of the shaft.

Still further, some embodiments of the present invention also operate using a single knob as follows:

(4) In an apparatus according to item (3) above, the support member includes a recess formed therein.

When the shaft rotates from the second rotational position to a third rotational position after the radially extending portion has pushed one of the opening side support member and the closing side support member, the recess prevents the radially extending portion of the shaft from interfering the other of the opening side support member and the closing side support member.

Still yet, some further embodiments of the present invention operate using a single knob as follows:

(5) In an apparatus according to item (4) above, the fourth cam surface of the fixed member includes a convex portion most convex in the axial direction of the shaft, a concave portion most concave in the axial direction of the shaft, an intermediate portion located between the convex portion and the concave portion in a rotational direction of the shaft, a first connecting surface connecting the concave portion and the intermediate portion, a second connecting surface connecting the intermediate portion and the convex portion, and a third connecting surface connecting the convex portion and the concave portion.

The first connecting surface obliquely extends from the concave portion to the intermediate portion in the rotational direction of the shaft and in the direction in which the knob pushes the shaft. The second connecting surface extends from the intermediate portion to the convex portion only in the direction in which the knob pushes the shaft. The third connecting surface obliquely extends from the convex portion to the concave portion in the rotational direction of the shaft and in a direction opposite the direction in which the knob pushes the shaft.

The shaft includes a fourth rotational position between the first rotational position and the second rotational position.

When a knob side tip of the third cam surface is positioned at the concave portion of the fourth cam surface, the shaft is positioned at the first rotational position.

When the knob side tip of the third cam surface is positioned at the third connecting surface of the fourth cam surface, the shaft is positioned at the second rotational position.

When the knob side tip of the third cam surface is positioned at the intermediate portion of the fourth cam surface, the shaft is positioned at the fourth rotational position.

(6) In an apparatus according to any one of items (1) and (2) above, the first rotational position and the third rotational position of the shaft are in diametrically opposed positions to each other.

The technical advantages of certain embodiments of the present invention are as follows:

According to the apparatus for opening and closing a door of a container apparatus of a vehicle of items (1)-(6) above, it may be possible to rotate the shaft to any of the first rotational position and the third rotational position by the single knob and to rotate any of the opening side arm and the closing side arm by the radially extending portion. Rotation of any of the opening side arm and the closing side arm is accompanied by rotation of the cam in one direction and in a reverse direction together with opening and closing of the door which operatively coupled to the cam. As a result, the door can be opened and closed by the single knob, whereas opening and closing of the door needs two knobs in the conventional apparatuses.

According to the apparatus for opening and closing a door of a container apparatus of item (3) above, since the opening side support member is rotatably coupled to the opening side arm and the closing side support member is rotatably coupled to the closing side arm, the support member can be pushed by the radially extending portion which is perpendicular to the axial direction of the shaft.

According to the apparatus for opening and closing a door of a container apparatus of item (4) above, since the support member has the recess, the radially extending portion of the shaft can be prevented from interfering with the support member when the shaft rotates.

According to the apparatus for opening and closing a door of a container apparatus of item (5) above, since the fourth cam surface has the intermediate portion, when pushing the knob to push the support member, it is possible to push the support member, after the shaft has been rotated about the axis of the shaft by a certain amount from a position corresponding to the concave portion. As a result, though the recess is formed in the support member, the radially extending portion of the shaft can push a portion of the support member other than the recess. As a result, when the knob is pushed, the radially extending portion of the shaft is prevented from contacting a corner of the recess and slipping relative to the corner of the recess.

According to the apparatus for opening and closing a door of a container apparatus of item (6) above, when the knob is pushed to open the door and then the knob is again pushed to close the door, the shaft is rotated by 360 degrees and returns to the original rotational position.

BRIEF DESCRIPTION OF THE DRAWINGS

FIG. 7 is a series of front elevational views of the third cam surface and the fourth cam surface, of the apparatus for the opening and closing of a door in accordance with certain embodiments of the present invention illustrated in an order of: (a) the state before the knob is pushed, (b) the state where the knob begins to be pushed, (c) the state where the knob is further pushed, (d) the state where the third cam surface has rode over the covex portion of the fourth cam surface, and (e) the state where pushing the knob is released.

DETAILED DESCRIPTION

In accordance with certain embodiments of the present invention, an apparatus for opening and closing a door of a container apparatus of a vehicle will be explained herein below with reference to FIGS. 1-7.

It is to be understood that the container apparatus of a vehicle, on which the opening and closing apparatus is utilized, may include a cup holder apparatus and an ash tray apparatus. The member, which is opened and closed, is not limited to a door. It is contemplated by embodiments of the present invention that the member to be opened and closed can include any member of a mechanism where the member is reciprocally moved when a force is imposed. In the embodiment and drawings discussed hereinbelow, the opening and closing apparatus for a door of a container apparatus of a vehicle will be taken as merely exemplary.

Figure 2:
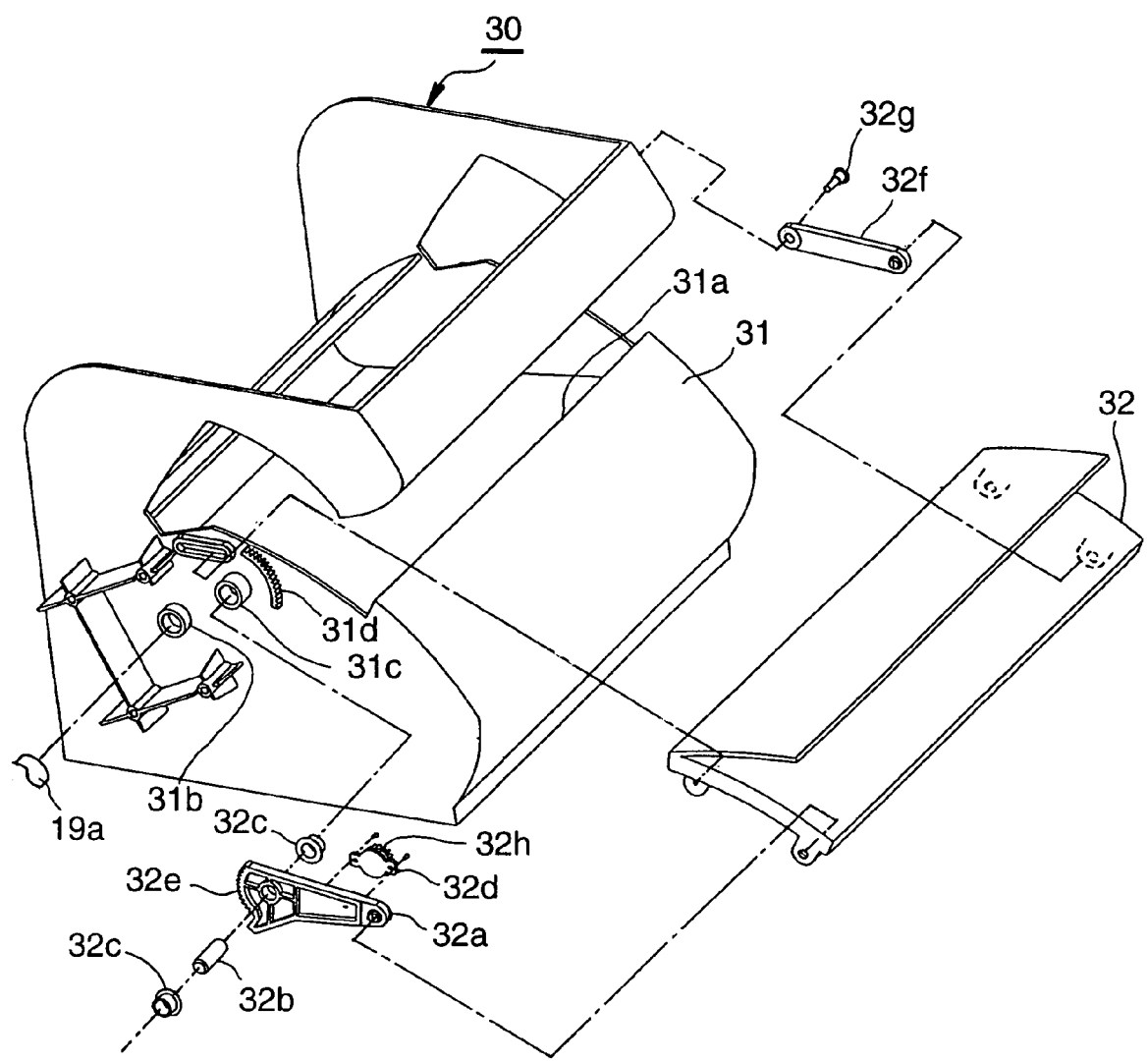
FIG. 2 is a perspective view of the container apparatus of a vehicle for which the apparatus for opening and closing a door in accordance with certain embodiments of the present invention is installed.

First, with reference to FIG. 2, a container apparatus 30 of a vehicle to which the opening and closing apparatus 10 of certain embodiments of the present invention is installed will be explained.

The container apparatus 30 includes an upper box apparatus disposed at an instrument panel in a front of a passenger seat of a vehicle. The container apparatus 30 is not limited to the upper box, but may be a glove box disposed at the instrument panel, a container apparatus of a vehicle for housing small goods therein, and/or a cup holder of a vehicle disposed at the instrument panel or places other than the instrument panel.

The container apparatus 30 includes an interior body 31 and a door 32. The interior body 31 includes a housing portion 31a open to a cabin (open upwardly). The interior body 31 may be formed integrally with the instrument panel. Alternatively, the interior body 31 may be made separately from the instrument panel and then be fixed to the instrument panel.

The door 32 is installed on the interior body 31 such that the door 32 is movable rotatably and/or linearly. The door 32 may be made in a form of a one-panel or a two-panel, such as for example an inner panel and an outer panel. The door 32 shown in the example includes one panel. The door 32 is movable relative to the interior body 31 between an open position where the door 32 opens the housing portion 31a and a closed position where the door 32 closes the housing portion 31a. The door 32 includes right side and left side door arms 32a, 32f.

One door arm 32a is rotatably coupled to a coupling portion 31c of the interior body 31. The one door arm 32a is rotatably coupled to the interior body 31 using a pin 32b and a collar 32c. A rotational speed of the one door arm 32a relative to the interior body 31 is suppressed by a damper 32d, and in turn a rotational speed of the door 32 is also suppressed by the damper 32d. The damper 32d is coupled to the one door arm 32a. A damper gear 32h of the damper 32d may be engaged with a gear 31d coupled to the interior body 31. The one door arm 32 includes a gear 32e which engages with a gear 21b of a drum 21 later described.

The other door arm 32f can be rotatably coupled to the interior body 31 using a screw 32g. A rotational axis of the other door arm 32f coincides with a rotational axis of the one door arm 32a.

Figure 1:
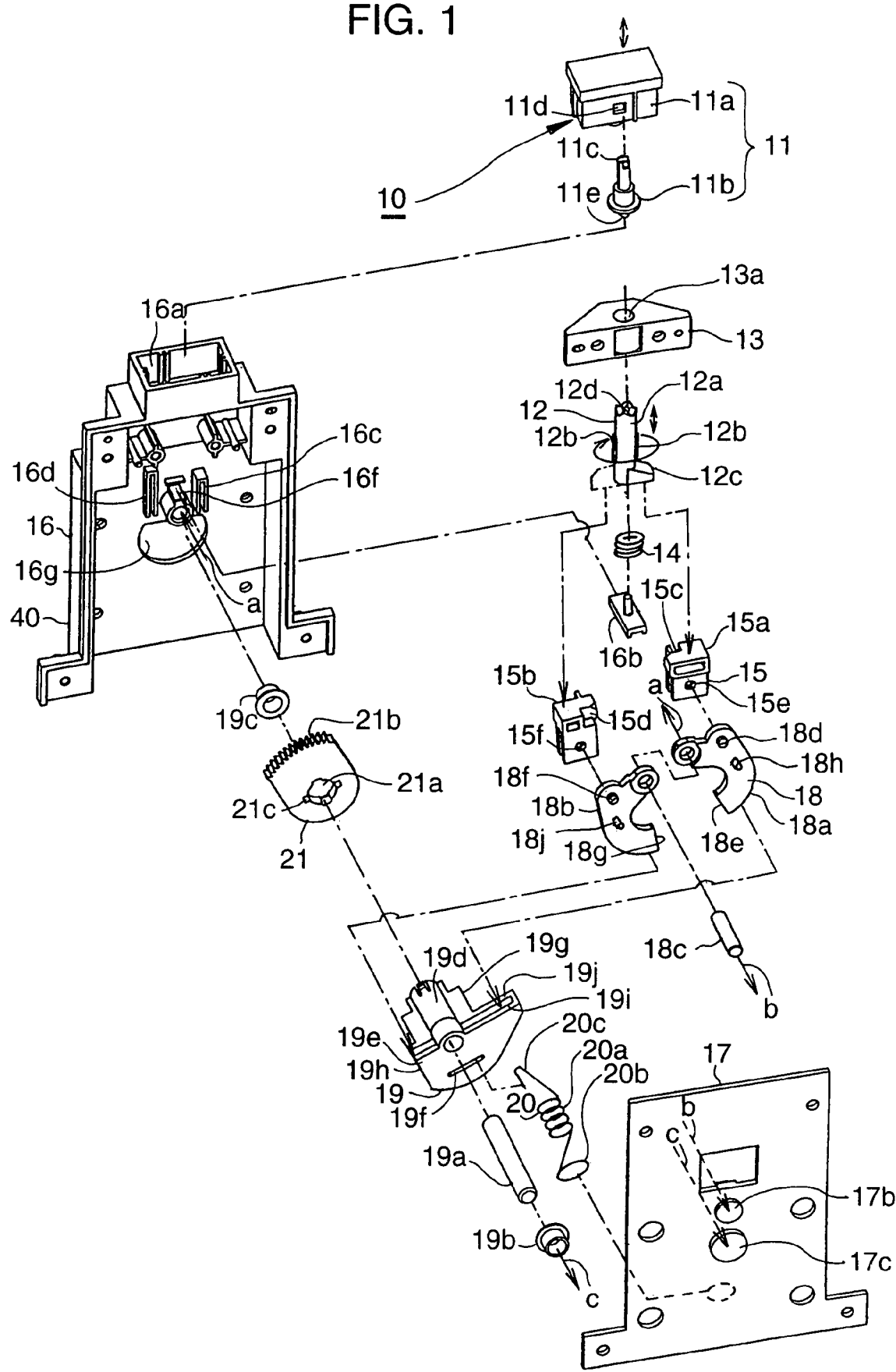
FIG. 1 is a perspective view of an apparatus for opening and closing a door of a container apparatus of a vehicle in accordance with certain embodiments of the present invention.
Figure 3:
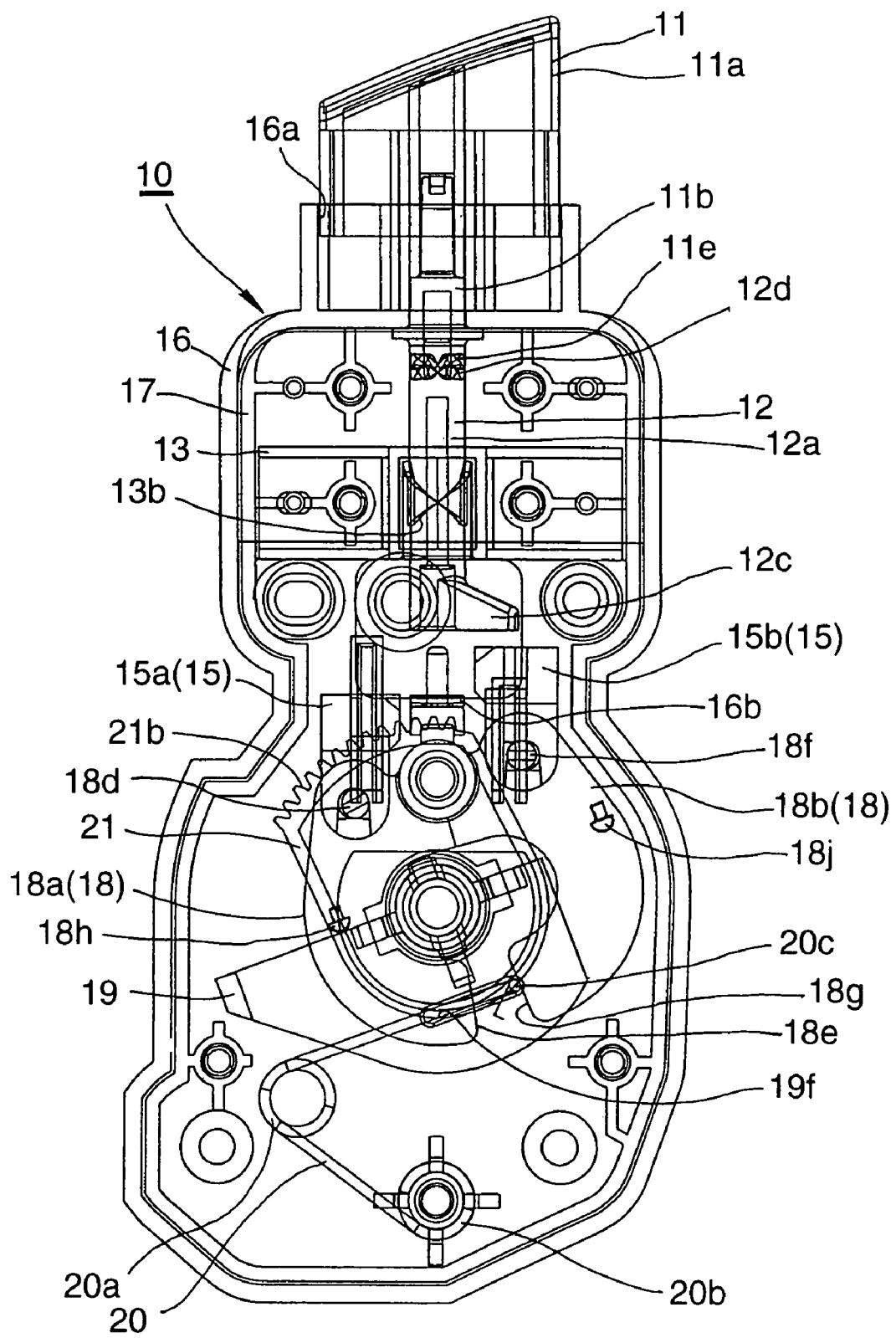
FIG. 3 is a front elevational view of the apparatus for opening and closing of a door in accordance with certain embodiments of the present invention.

Next, the opening and closing apparatus 10 will be explained. As illustrated in FIG. 1, the opening and closing apparatus 10 includes a knob 11, a shaft 12, a fixed member 40, a shaft biasing spring 14, and a support member 15. The fixed member 40 includes a guide 13, a casing 16 and a cover 17. The opening and closing apparatus 10 further includes an arm 18, a cam, a cam biasing spring 20 and a drum 21. Though the casing and the cover 17 may have complex configurations as shown in FIG. 3, for explanatory convenience the casing and the cover 17 are shown having rectangular configurations in FIG. 1.

The knob 11 is a member which is handled (pushed) by a driver or a passenger when the door 32 is opened or closed.

Only one knob 11 is provided. The knob 11 is supported by a support portion 16a of the casing 16 so as to be linearly movable in opposite directions in an axial direction of the shaft 12 (i.e., in an up and down direction). The knob 11 includes a knob body 11a and a knob support 11b.

The knob support 11b may be formed integrally with the knob body 11a, or may be formed separately from the knob body 11a and fixed to the knob body 11a. In the case where knob support 11b is formed separately from the knob body 11a, the knob support 11b may be fixed to the knob body 11a by engaging a hook 11c to a hook receiving hole 11d formed in the knob body 11a.

A first cam surface 11e is formed at a lower surface of the knob support 11b. The first cam surface 11e includes four convex and concave surfaces which are continuously arranged in a circumferential direction.

Figure 6:
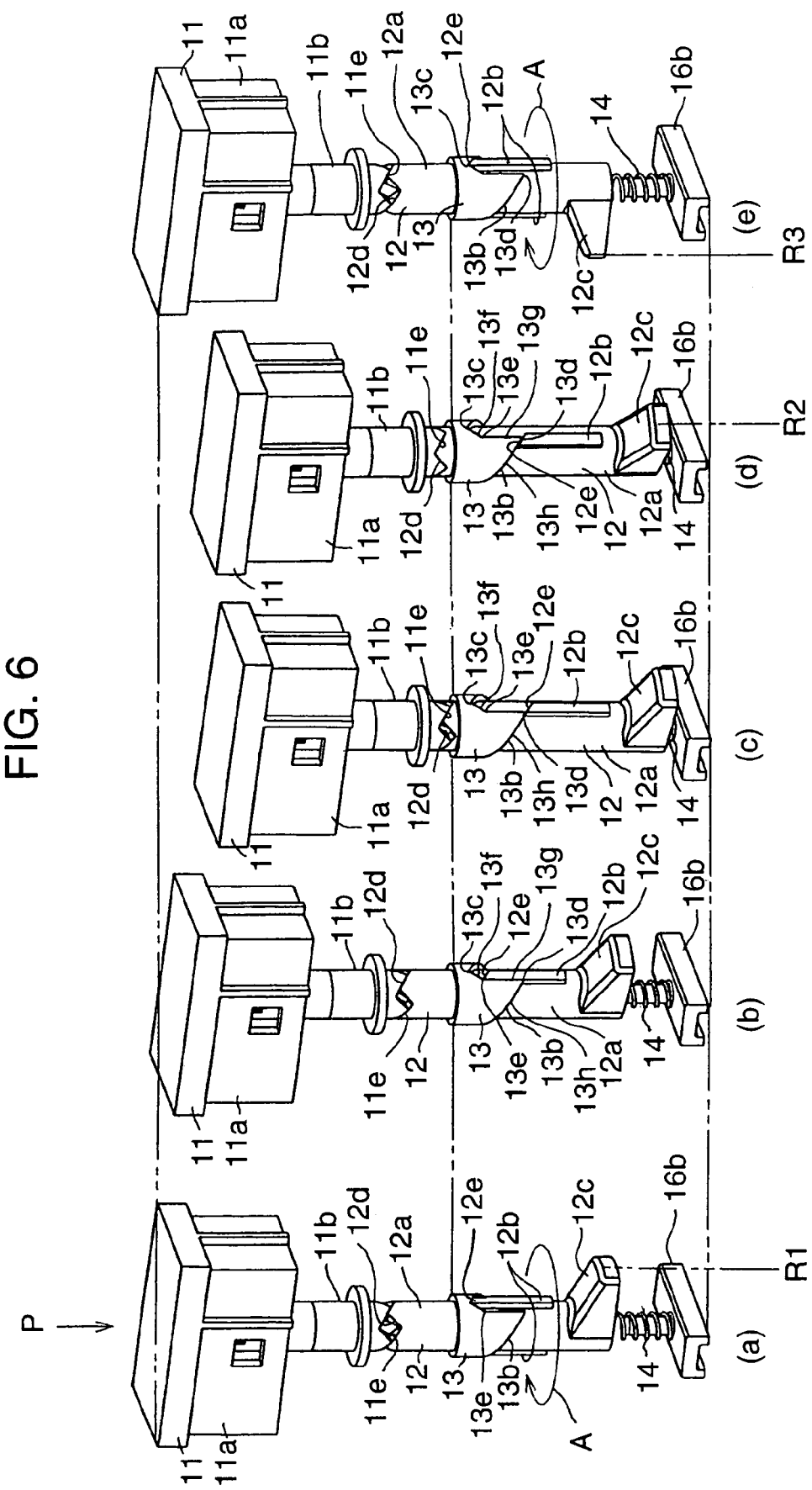
FIG. 6 is a series of perspective views of the apparatus for opening and closing a door in accordance with certain embodiments of the present invention illustrated in an order of: (a) a state before a knob is pushed, (b) a state where the knob begins to be pushed, (c) a state where the knob is further pushed, (d) a state where a third cam surface has rode over a convex portion of a fourth cam surface, and (e) a state where pushing the knob is released.

The shaft 12 is supported by the fixed member 40 so as to be movable in the axial direction of the shaft (up and down direction) and rotatable about the axis of the shaft 12 relative to the fixed member 40. The shaft 12 includes a fist rotational position R1, a second rotational position R2, a third rotational position R3 and a fourth rotational position R4. As illustrated in FIG. 6, the shaft 12 includes a shaft body 12a, a rib 12b and a radially extending portion 12c.

The shaft 12 extends in the up and down direction. The shaft 12a has a substantially cylindrical configuration. At an upper end surface of the shaft body 12a, a second cam surface 12d, which slidably contacts the first cam surface, 11e is formed. The second cam surface 12d includes four convex and concave surfaces which are continuously arranged in a circumferential direction.

The rib 12b is formed at a side surface of the shaft body 12a and two ribs 12b are provided. The rib 12b is located at an intermediate portion of the shaft in the up and down direction and extends in the up and down direction. The shaft 12b may be formed integrally with the shaft body 12a or may be formed separately from the shaft body 12a and fixed to the shaft body 12a. At an upper end surface of the rib 12b, a third cam surface 12e is formed. The third cam surface 12e is an inclining surface extending in a shaft rotational direction (A) and in an upward direction. The shaft rotational direction (A) is restricted by the first cam surface 11e, the second cam surface 12d, the third cam surface 12e and a fourth cam surface 13b (described herein below).

The radially extending portion 12c is formed at a lower end portion of the shaft body 12a. The radially extending portion 12c may be formed integrally with the shaft body 12a or may be formed separately from the shaft body 12a and fixed to the shaft body 12a. The radially extending portion 12c protrudes from the shaft body 12a in a direction perpendicular or substantially perpendicular to the up and down direction. The radially extending portion 12c has a flat lower surface.

The fixed member 40 is a member fixed relative to the interior body 31.

The guide 13 is fixed to the casing 16 by a screw (not shown) or other suitable fastener. As illustrated in FIG. 1, the guide 13 has a penetration hole 13a formed therein for allowing the shaft 12 to extend therethrough. The penetration hole 13a extends in the up and down direction. As illustrated in FIG. 6, a fourth cam surface 13b, which can slidably contact the third cam surface 12e, is formed at a wall defining the penetration hole 13a.

The fourth cam surface 13b is formed in a circumferential surface having an axis coincident with the axis of the shaft 12. As illustrated in FIG. 7, the fourth cam surface 13b includes a concave portion 13c most concave in the axial downward direction of the shaft, a convex portion 13d most convex in the axial downward direction of the shaft, an intermediate portion 13e located between the concave portion 13c and the convex portion 13d in a rotational direction (A) of the shaft, a first connecting surface 13f connecting the concave portion 13c and the intermediate portion 13e, a second connecting surface 13g connecting the intermediate portion 13e and the convex portion 13d, and a third connecting surface 13h connecting the convex portion 13d and the concave portion 13c.

Two sets of the concave portion 13c, the convex portion 13d, the intermediate portion 13e, the first, second and third connecting surfaces 13f, 13g, 13 are provided in a circumference about the axis of the shaft 12.

The first connecting surface 13f is an inclined surface extending in the rotational direction (A) and in the downward direction from the concave portion 13c. The second connecting surface 13g extends in the up and down direction only in parallel with the axis of the shaft. The third connecting surface 13h is an inclined surface extending in the rotational direction (A) and in the upward direction from the convex portion 13d.

An upper end of the third cam surface 12e is positioned at the concave portion 13c, the shaft is positioned at the first rotational position R1 (or the third rotational position R3). The upper end of the third cam surface 12e is positioned on the way of third cam surface 13h, the shaft 12 is positioned at the second rotational position R2. The upper end of the third cam surface 12e is positioned at the intermediate portion 13e, the shaft 12 is positioned at the fourth rotational position R4. The first rotational position R1 and the third rotational position R3 are offset from each other by 180 degrees in the rotational direction (A) of the shaft.

As illustrated in FIG. 6, the shaft biasing spring 14 is constructed from, for example, a coil spring. An upper end of the shaft biasing spring 14 contacts the shaft 12, and a lower end of the shaft biasing spring 14 contacts a spring base 16b coupled to the casing 16. The shaft biasing spring 14 biases the shaft 12 in the upward direction relative to the casing 6. Since the shaft biasing spring 14 biases the shaft 12 upwardly, the second cam surface 12d of the shaft 12 is pushed against the first cam surface 11e of the knob 11, and the third cam surface 12e of the shaft 12 is pushed against the fourth cam surface 13b of the cam 14.

When the knob 11 is pushed downwardly, the support 15 is pushed downwardly by the radially extending portion 12c of the shaft 12. As illustrated in FIG. 1, the support member 15 includes an opening side support member 15a and a closing side support member 15b.

The opening side support member 15a is guided by an opening side support guide groove 16c formed in the casing 16 so as to be movable in the up and down direction only relative to the casing 16. At one portion of an upper portion of the opening side support member 15a, a recess 15c is formed. The recess 15c is formed by cutting off (concaving) the one portion of the upper portion of the opening side support member 15c. The recess 15c prevents the radially extending portion 12c from interfering with a side surface of the opening side support member 15a when the shaft 12 rotates about the axis of the shaft 12, and allows the shaft 12 to rotate further.

The closing side support member 15b is guided by a closing side support guide groove 16d formed in the casing 16 so as to be movable in the up and down direction only relative to the casing 16. At one portion of an upper portion of the closing side support member 15b, a recess 15d is formed. The recess 15d is formed by cutting off (concaving) the one portion of the upper portion of the closing side support member 15b. The recess 15d prevents the radially extending portion 12c from interfering with a side surface of the closing side support member 15b when the shaft 12 rotates about the axis of the shaft 12 and allows the shaft 12 to rotate further.

The casing 16 is fixed to the interior body 31 by, for example, by a screw (not shown) or other suitable fastener. The cover 17 is fixed to the casing 16 by, for example, by a screw (not shown) or other suitable fastener. The casing 16 and the cover 17 are fixed to the casing 16 to form a box.

The arm 18 includes an opening side arm 18a and a closing side arm 18b. The opening side arm 18a and the closing side arm 18b are supported by a arm supporting shaft 18c and are rotatable to each other about an axis of the arm supporting shaft 18c. The arm supporting shaft 18c is located at upper end portions of the opening side arm 18a and the closing side arm 18b or the vicinity thereof. The arm supporting shaft 18c is coupled to the casing 16 at an arm supporting shaft coupling portion 16f and to the cover 17 at an arm supporting shaft coupling portion 17b. The arm 18 is rotatable relative to the casing 16.

The opening side arm 18a includes a protrusion 18d and a spring pushing portion 18e.

The protrusion 18d is provided at the upper end portion of the opening side arm 18a or the vicinity thereof, and extends parallel to the arm supporting shaft 18c. The protrusion 18d is inserted into an arm coupling hole 15e formed in the opening side support member 15a, whereby the opening side arm 18a and the opening side support member 15a are coupled to each other.

The spring pushing portion 18e is a lower end portion of the opening side arm 18a itself. When the knob 11 is pushed for opening the door 32 which is at a closed position, the spring pushing portion 18e of the opening side arm 18a pushes an end portion 20c of the cam biasing spring 20 to move the end portion 20c in a spring guide slit 19f formed in the cam 19.

At least one of the opening side arm 18a and the closing side arm 18b, a cam driving protrusion 18h capable of being moved into contact with the cam 19 is provided. The cam driving protrusion 18h may be provided to the opening side arm 18a only. The cam driving protrusion 18h may be provided to the closing side arm 18b or to both the opening side arm 18a and the closing side arm 18b.

It may be preferable in certain embodiments that the cam driving protrusion 18h, which is not moved into contact with the cam 19, is provided to the closing side 18b also, because the opening side arm 18a and the closing side arm 18b can be made using the same mold and an economical advantage can be obtained compared with a case where the arms 18a and 19b are made using independent molds.

Figure 4:
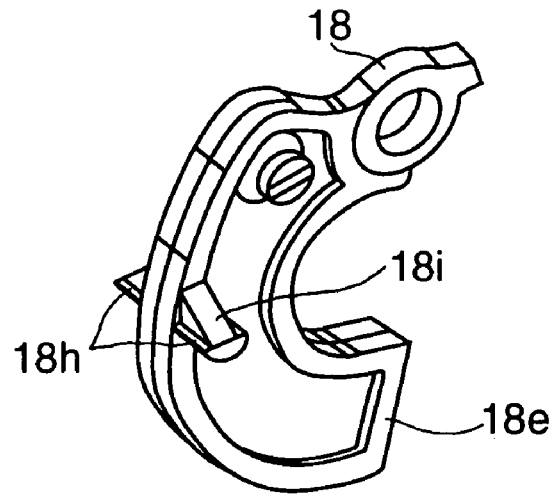
FIG. 4 is a perspective view of an opening side arm of the opening and closing apparatus of a door in accordance with certain embodiments of the present invention.

As illustrated in FIG. 4, the cam driving protrusion 18h is formed at a vertically intermediate portion of the opening side arm 18a. The cam driving protrusion 18h protrudes from opposite surfaces of the opening side arm 18a in a direction parallel or substantially parallel to the rotational axis of the opening side arm 18a. Preferably, the cam driving protrusion 18h includes a reinforcing rib 18i integrally formed the cam driving protrusion 18h, for preventing the cam driving protrusion 18h from being deformed when the cam driving protrusion 18h is moved into contact with the cam 19.

The cam 19 is rotatable relative to the fixed member 40. As illustrated in FIG. 1, the cam 19 has a cam shaft 19a which is coupled to the fixed member 40 and the interior body 31. The cam shaft 19a is coupled to a cam shaft coupling portion 17c formed in the cover 17 and a cam shaft coupling portion 31b formed in the interior body 31 using collar 19b and 19c. The cam shaft 19a extends through a cam shaft hole 16g formed in the casing 16. The cam 19 includes a rotational central portion 19d, a plate portion 19e and the spring guide slit 19f.

The rotational central portion 19d is cylindrical. The cam shaft 19a extends through the rotational central portion 19d. A protrusion 19g for preventing the drum 21 from rotating relative to the cam 19 is formed in the rotational central portion 19d.

The plate portion 19e includes two plates 19i and 19j having a gap therebetween. The two plates 19i and 19j are connected to each other at one portion thereof. The spring pushing portion 18e, 18g of the arm 18 can go into and come out of the gap between the two plates 19i and 19j. The cam driving protrusion 18h interferes with the two plates 19i and 19j to drive the cam and cannot enter the gap between the plates 19i and 19j.

Figure 5:
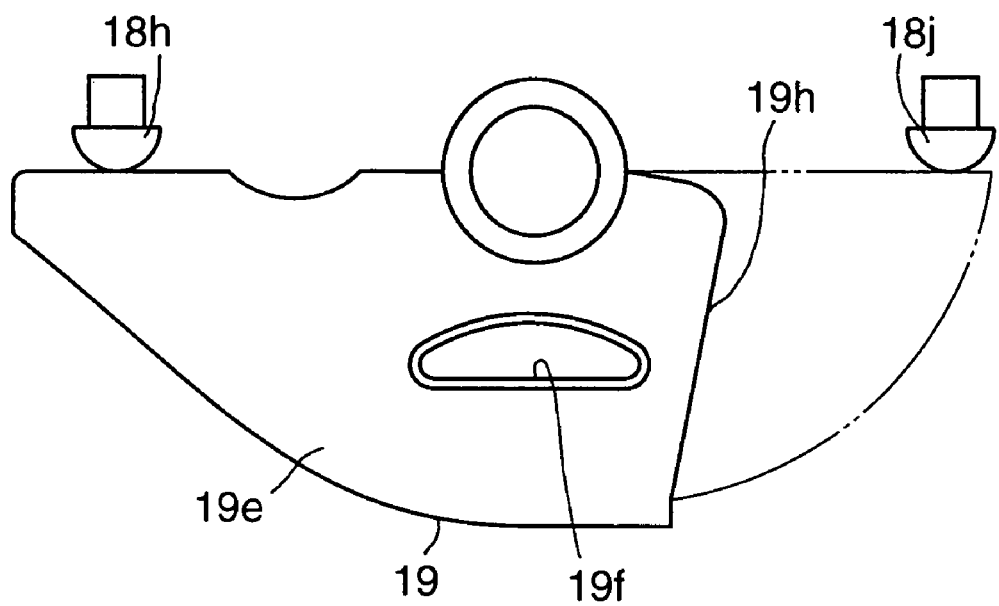
FIG. 5 is a front elevational view of a cam in a case where the cam has an extended portion and the cam is engageable with a cam driving protrusion of a closing side arm in accordance with certain embodiments of the present invention.

In a case where a protrusion 18j having the same configuration as that of the cam driving protrusion 18h is formed in the closing side arm 18b, it is preferable that, as illustrated in FIG. 5, one portion 19h of the plate portion 19e is cut off in order to prevent the protrusion 18j from contacting the cam 19 to give an influence to the pushing force of the knob 11 when the cam driving protrusion 18h is contacting the cam 19.

The spring guide slit 19f is formed in the plate portion 19e. The spring guide slit 19f extends in a direction different from or perpendicular to a radial direction extending from the rotational axis 19d. The spring guide slide 19f is located at a radially outer end portion or the vicinity thereof of the plate portion 19e about the rotational axis 19d. An end portion 20c of the cam biasing spring 20 is slidably hooked to the spring guide slit 19f.

As illustrated in FIG. 1, the cam biasing spring 20 is a torsional spring. The cam biasing spring 20 is used as a turn over spring for changing a direction of rotation of the cam 19. The biasing spring 20 includes a coil portion 20a, a first end portion 20b and the second, opposite end portion 20c.

The first end portion 20b is rotatably hooked to the cover 18. The second end portion 20c is hooked to the spring guide slide 19f of the cam 19. The second end portion 20c is movable in the spring guide slit 19 in a direction in which the spring guide slit 19 extends.

A turning over point at which the cam biasing spring 20 turns over rotation of the cam 19 is on the way of movement of the second end portion 20c in the the spring guide slit 19 form one longitudinal end to the other longitudinal end of the spring guide slit 19.

The drum 21 is coupled to the cam 19 so as not rotate to each other. The drum 21 has a hole receiving the rotational central portion 19d of the cam 19 therein and a gear 21b with which a gear 32e of the door arm 32a engages.

The hole 21a has a protrusion receiving portion 21c receiving a protrusion 19g of the cam 19. When the protrusion 19g enters the protrusion receiving portion 21c, the drum 21 cannot rotate relative to the cam 19.

The gear 21b is formed at the outside surface of the drum 21.

A procedure to open the door 32 by pushing the knob 11 in accordance with certain embodiments of the present invention will now be explained.

(i) In a state where a pushing force is not imposed on the knob 11

As illustrated in (a) of FIG. 6, the first cam surface 11e of the knob 11 and the second cam surface 12d of the shaft 12 contact each other at the first rotational position of the shaft where the convex portion of the second cam surface 12d is offset by a small rotational amount from the convex portion of the first cam surface 11a in the rotational direction of the shaft. In this state, as illustrated in (a) of FIG. 7, the third cam surface 12e of the shaft 12 is positioned at the concave portion 13c of the fourth cam surface 13b of the guide 13.

A large portion of the radially extending portion 12c is located above the recess 15c of the opening side support member 15a.

(ii) In a state where the knob 11 is pushed:

As illustrated in (b) of FIG. 6, when the knob 11 is pushed downward, the shaft 12 is pushed by the knob 11 to move downward in opposition to the biasing force of the shaft biasing spring 14. The first cam surface 11e and the second cam surface 12d slide to each other whereby the shaft 12 rotates in the shaft rotational direction (A) about the rotational axis of the shaft 12. As illustrated in (b) of FIG. 7, the third cam surface 12e slides on the first connecting surface 13f of the fourth cam surface 13b, whereby the third cam surface 12e moves from the concave portion 13c to the intermediate portion 13e of the fourth cam surface 13b.

A large portion of the radially extending portion 12c moves to a position above the portion other than the recess 15c of the opening side support member 15a. (iii). In a state where the knob 11 is further pushed:

When the knob 11 is further pushed, as illustrated in (b) of FIG. 6, since the first cam surface 11e and the second cam surface 12d contact each other in the state where they are offset from each other in the rotational direction, the shaft 12 is further driven in the rotational direction (A) about the rotational axis of the shaft 12. However, since the rib 12b contacts the second connecting surface 13g of the fourth cam surface 13b, the shaft 12 cannot rotate in the shaft rotational direction (A). As a result, as illustrated in (c) of FIG. 6 and (c) of FIG. 7, the shaft 12 moves downward along the second connecting surface 13g of the fourth cam surface 13b without rotating. At that time, the opening side support member 15a is pushed by the radially extending portion 12c of the shaft 12.

When the opening side support member 15a is pushed by the radially extending portion 12, as illustrated in FIG. 3, the opening side arm 18a rotates because the opening side support member 15a and the opening side arm 18a are connected to each other. When the opening side arm 18a rotates, the cam driving protrusion 18h is moved into contact with the upper surface of the cam 19 to rotate the cam 19. At the same time or at the substantially same time when the cam driving protrusion 18h rotates the cam 19, the spring pushing portion 18e of the opening side arm 18a pushes the second end portion 20c of the cam biasing spring 20 which is located at one end portion of the spring guide slit 19f. When pushed by the spring pushing portion 18e, the second end portion 20c of the cam biasing spring 20 moves from the one end portion of the spring guide slide 19f toward the other end portion of the spring guide slit 19f. At a turning over point located on the way from the one end portion toward the other end portion of the spring guide slit 19f, the cam biasing spring 20 turns over to move by itself from the turning over point to the other end portion of the spring guide slit 19f and to turn over the direction of rotation of the cam 19. When the second end portion 20c of the cam biasing spring 20 moves from the turning over point toward the other end portion of the spring guide slit 19f, the second end portion 20c of the cam biasing spring 20 pushes the spring pushing portion 18g of the closing side arm 18b. When the closing side arm 18b is pushed by the cam biasing spring 20, the closing side support member 15b moves upward because the closing side arm 18b and the closing side support member 15b are connected to each other.

Since the drum 21 is fixedly coupled to the cam 19, the drum 21 rotates together with the cam 19. When the drum 21 rotates, the door 32 opens relative to the interior body 31, because the gear 21b of the drum 21 engages with the gear 32e of the door arm 32a.

(iv) In a state where the knob 11 is pushed to an extent that the third cam surface 12e has rode over the convex portion 13d of the fourth cam surface 13b:

As illustrated in (c) of FIG. 6, when the knob 11 is pushed to an extent that the third cam surface 12e has rode over the convex portion 13d of the fourth cam surface 13b, since the first cam surface 11e and the second cam surface 12d are contacting each other at a rotational position where the first cam surface 11e and the second cam surface 12d are offset from a matching position, the shaft 12 rotates in the rotational direction (A) about the axis of the shaft 12 to a rotational position of (d) of FIG. 6 where a rotational offsetting amount between the first cam surface 11e and the second cam surface 12d becomes zero. At this moment, as illustrated in (d) of FIG. 7, the third cam surface 12e is located on the third connecting surface 13h.

(v) In a state where the pushing force on the knob 11 is released:

When the knob 11 is released by moving a hand apart from the knob 11, the shaft 12 moves upward, biased by the shaft biasing spring 14. The knob 11 moves upward, pushed by the shaft 12. When the knob 11 is released, the third cam surface 12e slidably contacts the third connecting surface 13h to rotate the shaft about the rotational axis in the rotational direction (A), and the third cam surface 12e finally arrives at the concave portion 13c of the fourth cam surface 13b.

At that time, the radially extending portion 12c of the shaft 12 passes through the recess 15d of the closing side support member 15b, so that the radially extending portion 12c does not interfere with the side surface of the closing side support member 15b.

When the third cam surface 12e arrives at the concave portion 13c as illustrated in (e) of FIG. 7, the first cam surface 11e and the second cam surface 12d contact each other at a rotational position where the convex portion of the second cam surface 12d is offset by a small amount from the convex portion of the first cam surface 11a in the rotational direction of the shaft as illustrated in (e) of FIG. 6.

The knob 11 is positioned at the same position in the up and down direction as the position which the knob 11 took before the door 32 is opened.

The shaft 12 is positioned at a rotational position offset by 180 degrees from the rotational position which the shaft 12 took before the door 32 is opened. A large portion of the radially extending portion 12c of the shaft 12 is positioned above the recess 15d of the closing support member 15b.

Next, a procedure to close the door 32 by pushing the knob 11 in accordance with embodiments of the present invention will be explained.

(i) In a state where a pushing force is not imposed on the knob 11:

As illustrated in (a) of FIG. 6, the first cam surface 11e and the second cam surface 12d contact each other at the rotational position of the shaft where the convex portion of the second cam surface 12d is offset by a small rotational amount from the convex portion of the first cam surface 11a in the rotational direction of the shaft. In this state, as illustrated in (a) of FIG. 7, the third cam surface 12e is positioned at the concave portion 13c of the fourth cam surface 13b.

A large portion of the radially extending portion 12c is located above the recess 15d of the closing side support member 15b.

(ii) In a state where the knob 11 is pushed:

As illustrated in (b) of FIG. 6, when the knob 11 is pushed downward, the shaft 12 is pushed by the knob 11 to move downward in opposition to the biasing force of the shaft biasing spring 14. The first cam surface 11e and the second cam surface 12d slide to each other whereby the shaft 12 rotates in the shaft rotational direction (A) about the rotational axis of the shaft 12. As illustrated in (b) of FIG. 7, the third cam surface 12e slides on the first connecting surface 13f of the fourth cam surface 13b, whereby the third cam surface 12e moves from the concave portion 13c to the intermediate portion 13e of the fourth cam surface 13b.

A large portion of the radially extending portion 12c moves to a position above the portion other than the recess 15d of the closing side support member 15b (iii). In a state where the knob 11 is further pushed:

When the knob 11 is further pushed, as illustrated in (b) of FIG. 6, since the first cam surface 11e and the second cam surface 12d contact each other in the state where they are offset from each other in the rotational direction, the shaft 12 is further driven in the rotational direction (A) about the rotational axis of the shaft 12. However, since the rib 12b contacts the second connecting surface 13g of the fourth cam surface 13b, the shaft 12 cannot rotate in the shaft rotational direction (A). As a result, as illustrated in (c) of FIG. 6 and (c) of FIG. 7, the shaft 12 moves downward along the second connecting surface 13g of the fourth cam surface 13b without rotating. At that time, the closing side support member 15b is pushed by the radially extending portion 12c of the shaft 12.

When the closing side support member 15b is pushed by the radially extending portion 12, as illustrated in FIG. 3, the closing side arm 18b rotates because the closing side support member 15b and the closing side arm 18b are connected to each other. When the closing side arm 18b rotates, the spring pushing portion 18g pushes the second end portion 20c of the cam biasing spring 20 which is located at the other end portion of the spring guide slit 19f. When pushed by the spring pushing portion 18g, the second end portion 20c of the cam biasing spring 20 moves from the other end portion of the spring guide slide 19f toward the one end portion of the spring guide slit 19f. At a turning over point located on the way from the other end portion toward the one end portion of the spring guide slit 19f, the cam biasing spring 20 turns over to move by itself from the turning over point to the one end portion of the spring guide slit 19f and to turn over the direction of rotation of the cam 19. When the second end portion 20c of the cam biasing spring 20 moves from the turning over point toward the one end portion of the spring guide slit 19f, the second end portion 20c of the cam biasing spring 20 pushes the spring pushing portion 18e of the opening side arm 18a. When the opening side arm 18a is pushed by the cam biasing spring 20, the opening side support member 15a moves upward because the opening side arm 18a and the opening side support member 15a are connected to each other.

Since the drum 21 is fixedly coupled to the cam 19, the drum 21 rotates together with the cam 19. When the drum 21 rotates, the door 32 closes relative to the interior body 31, because the gear 21b of the drum 21 engages with the gear 32e of the door arm 32a.

(iv) In a state where the knob 11 is pushed to an extent that the third cam surface 12e has rode over the convex portion 13d of the fourth cam surface 13b:

As illustrated in (c) of FIG. 6, when the knob 11 is pushed to an extent that the third cam surface 12e has rode over the convex portion 13d of the fourth cam surface 13b, since the first cam surface 11e and the second cam surface 12d are contacting each other at a rotational position where the first cam surface 11e and the second cam surface 12d are offset from the matching position, the shaft 12 rotates in the rotational direction (A) about the axis of the shaft 12 to a rotational position of (d) of FIG. 6 where a rotational offsetting amount between the first cam surface 11e and the second cam surface 12d becomes zero. At this moment, as illustrated in (d) of FIG. 7, the third cam surface 12e is located on the third connecting surface 13h.

(v) In a state where the pushing force on the knob 11 is released:

When the knob 11 is released by moving a hand apart from the knob 11, the shaft 12 moves upward, biased by the shaft biasing spring 14. The knob 11 moves upward, pushed by the shaft 12. When the knob 11 is released, the third cam surface 12e slidably contacts the third connecting surface 13h to rotate the shaft about the rotational axis in the rotational direction (A), and the third cam surface 12e finally arrives at the concave portion 13c of the fourth cam surface 13b.

At that time, the radially extending portion 12c of the shaft 12 passes through the recess 15c of the opening side support member 15a, so that the radially extending portion 12c does not interfere with the side surface of the opening side support member 15a.

When the third cam surface 12e arrives at the concave portion 13c as illustrated in (e) of FIG. 7, the first cam surface 11e and the second cam surface 12d contact each other at a rotational position where the convex portion of the second cam surface 12d is offset by a small amount from the convex portion of the first cam surface 11a in the rotational direction of the shaft as illustrated in (e) of FIG. 6.

The knob 11 is positioned at the same position in the up and down direction as the position which the knob 11 took before the door 32 is closed.

The shaft 12 is positioned at a rotational position offset by 180 degrees from the rotational position which the shaft 12 took before the door 32 is closed. A large portion of the radially extending portion 12c of the shaft 12 is positioned above the recess 15c of the opening support member 15a.

Next, technical advantages of certain embodiments of the present invention will be explained.

With the apparatus for opening and closing a door in accordance with embodiments of the present invention, it is possible to rotate the shaft 12 to any of the first rotational position and the third rotational position by the single knob 11 and to rotate any of the opening side arm 18a and the closing side arm 18b by the radially extending portion 12c. When any one of the opening side arm 18a or the closing side arm 18b rotates, the cam 19 is rotated in one direction or in the reverse direction, and the door 32 operatively coupled to the cam 19 is opened and closed. As a result, the door 32 can be opened and closed by the single knob 11, whereas opening and closing of the door needs two knobs in conventional apparatuses.

Since the opening side support member 15a is rotatably coupled to the opening side arm 18a and the closing side support member 15b is rotatably coupled to the closing side arm 18b, the support member can be pushed by the radially extending portion which is perpendicular to the axial direction of the shaft 12 so that the door 32 is opened and closed. More particularly, when a closed door 32 is opened, the knob 11 is pushed and the opening side support member 15a is pushed by the radially extending portion 12c so that the opening side arm 18a is rotated. When an open door 32 is closed, the knob 11 is pushed and the closing side support member 15*b* is pushed by the radially extending portion 12*c* which has been rotated by 180 degrees, so that the closing side arm 18*b* is rotated.

Since the support member 15*a*, 15*b* includes the recess 15*c*, 15*d*, respectively, when the shaft 12 rotates, the radially extending portion 12*c* of the shaft 12 is prevented from interfering with the support member 15*a*, 15*b*.

Since the fourth cam surface 13*b* has the intermediate portion 13*e*, when pushing the knob 11 and causing the radially extending portion 12*c* of the shaft 12 to push the support member 15, it is possible to cause the radially extending portion 12*c* to push the support member 15 after the shaft 12 has been rotated about the axis of the shaft 12 by a certain amount. As a result, though the recess 15*c*, 15*d* is formed in the support member 15*a*, 15*b*, respectively, the radially extending portion 12*c* of the shaft 12 can push a portion of the support member 15*a*, 15*b* other than the recess 15*c*, 15*d*.

Since the cam driving protrusion 18*h* is provided to the opening side arm 18*a*, by pushing the knob 11 to a position where the cam driving protrusion 18*h* begins to rotate the cam 19, the door 32 can begin to open. As a result, for beginning to open the door 32, the knob 11 is not required to be pushed to a position where the cam biasing spring 20 turns over rotation of the cam 19. Therefore, a knob operating feeling for opening the door 32 is improved, compared with a case where the cam driving protrusion 18*h* is not provided.

Though the case where the cam driving protrusion 18*h* is provided to the opening side arm 18*a* only has been explained above, in alternative arrangements, the cam driving protrusion 18*h* may be provided to the closing side arm 18*b* only so that the cam driving protrusion 18*h* can contact with the cam 19, in a case where a knob operational feeling for closing the door 32 may need improvement.

Further, in a case where the knob operational feeling for opening the door 32 and closing the door 32 may need to be improved, the cam driving protrusion 18*h* may be provided to not only the opening side arm 18*a* but also the closing side arm 18*b* so that each of the cam driving protrusions provided to the opening side arm 18*a* and the closing side arm 18*b* can be moved into contact with the cam 19.

What is claimed is:

1. An apparatus for opening and closing a door of a container apparatus of a vehicle, the apparatus, comprising:
   a single knob, a shaft having an axial direction and an axis, a fixed member, a shaft biasing spring, an arm, and a cam,
   (a) the knob being disposed so as to oppose a first axial end of the shaft and being supported by the fixed member so as to be movable in the axial direction of the shaft relative to the fixed member, the knob including a first cam surface,
   (b) the shaft being supported by the fixed member so as to be movable in the axial direction of the shaft and rotatable about the axis of the shaft relative to the fixed member, the shaft having a first rotational position, a second rotational position and a third rotational position, the shaft having a radial direction perpendicular to the axial direction of the shaft and having a radially extending portion extending in the radial direction of the shaft, the shaft including a second cam surface and a third cam surface, the second cam surface being capable of slidably contacting the first cam surface of the knob,
   (c) the fixed member including a fourth cam surface capable of slidably contacting the third cam surface of the shaft,
   (d) the shaft biasing spring being disposed at a second axial end of the shaft, the shaft biasing spring biasing the shaft in a direction opposite a direction in which the knob pushes the shaft,
   (d-1) wherein the knob pushes the shaft so that the first cam surface of the knob being moved into slidable contact with the second cam surface of the shaft and the knob rotating the shaft from the first rotational position to the second rotational position,
   (d-2) when pushing of the shaft by the knob is released, the third cam surface of the shaft being pushed by the shaft biasing spring against the fourth cam surface of the fixed member and the shaft biasing spring further rotating the shaft from the second rotational position to the third rotational position,
   (d-3) the third rotational position being a first rotational position of a successive shaft rotation,
   (e) the arm having an arm rotational axis extending in a direction perpendicular to the axial direction of the shaft and being supported by the fixed member so as to be rotatable about the arm rotational axis, the arm including an opening side arm and a closing side arm,
   (e-1) when the shaft is positioned at one rotational position of the first rotational position and the third rotation position, the opening side arm being positioned at a position corresponding to the radially extending portion of the shaft in the axial direction of the shaft, and
   (e-2) when the shaft is positioned at the other rotational position of the first rotational position and the third rotation position, the closing side arm being positioned at a position corresponding to the radially extending portion of the shaft in the axial direction of the shaft,
   (e-3) when the shaft is positioned at said one rotational position and when the shaft is moved in the axial direction by being pushed by the knob, the opening side arm being pushed by the radially extending portion to rotate relative to the fixed member, and
   (e-4) when the shaft is positioned at the other rotational position and when the shaft is moved in the axial direction by being pushed by the knob, the closing side arm being pushed by the radially extending portion to rotate relative to the fixed member,
   (e-5) at least one of the opening side arm and the closing side arm having a cam driving protrusion formed therein, when the at least one of the opening side arm and the closing side arm is pushed by the shaft, the cam driving protrusion rotating together with the at least one of the opening side arm and the closing side arm and being moved into contact with the cam to drive the cam,
   (f) the cam having a cam rotational axis extending in parallel with the arm rotational axis, the cam being supported by the fixed member so as to be rotatable in opposite rotational directions about the cam rotational axis, the cam being operatively coupled to the door of the container apparatus such that rotation of the cam in the opposite rotational directions correspond to opening and closing of the door.

2. An apparatus for opening and closing a door of a container apparatus of a vehicle comprising a single knob, a shaft having an axial direction and an axis, a fixed member, a shaft biasing spring, an arm and a cam,
   (a) the knob being supported by the fixed member so as to be movable in the axial direction of the shaft relative to the fixed member,
   (b) the shaft being supported by the fixed member so as to be movable in the axial direction of the shaft and rotatable about the axis of the shaft relative to the fixed member, the shaft having a first rotational position, a second rotational position and a third rotational position, the shaft having a radially extending portion extending in a radial direction of the shaft perpendicular to the axial direction of the shaft, (d) the shaft biasing spring biasing the shaft in a direction opposite a direction in which the knob pushes the shaft, (d-1) when the knob pushes the shaft, the knob rotating the shaft from the first rotational position to the second rotational position, (d-2) when pushing of the shaft by the knob is released, the shaft biasing spring rotating the shaft from the second rotational position to the third rotational position, (d-3) the third rotational position being a first rotational position of a successive shaft rotation, (e) the arm having an arm rotational axis extending in a direction perpendicular to the axial direction of the shaft and being supported by the fixed member so as to be rotatable about the arm rotational axis, the arm including an opening side arm and a closing side arm, (e-1) when the shaft is positioned at one rotational position of the first rotational position and the third rotation position, the opening side arm being positioned at a position corresponding to the radially extending portion of the shaft in the axial direction of the shaft, and (e-2) when the shaft is positioned at the other rotational position of the first rotational position and the third rotation position, the closing side arm being positioned at a position corresponding to the radially extending portion of the shaft in the axial direction of the shaft, (e-3) when the shaft is positioned at said one rotational position and when the shaft is moved in the axial direction by being pushed by the knob, the opening side arm being pushed by the radially extending portion to rotate relative to the fixed member, and (e-4) when the shaft is positioned at said the other rotational position and when the shaft is moved in the axial direction by being pushed by the knob, the closing side arm being pushed by the radially extending portion to rotate relative to the fixed member, (e-5) at least one of the opening side arm and the closing side arm having a cam driving protrusion formed therein, when the at least one of the opening side arm and the closing side arm is pushed by the shaft, the cam driving protrusion rotating together with the at least one of the opening side arm and the closing side arm and being moved into contact with the cam to drive the cam, (f) the cam having a cam rotational axis extending in parallel with the arm rotational axis, the cam being supported by the fixed member so as to be rotatable in opposite rotational directions about the cam rotational axis, the cam being operatively coupled to the door of the container apparatus such that rotation of the cam in the opposite rotational directions correspond to opening and closing of the door.

3. The apparatus according to claim 1, further comprising a support member, wherein the support member includes an opening side support member and a closing side support member, the opening side support member being rotatably coupled to the opening side arm and the closing side support member being rotatably coupled to the closing side arm, when the shaft is pushed by the knob and is rotated from the first rotational position to the second rotational position, either one of the opening side support member and the closing side support member, which is located so as to correspond to the radially extending portion of the shaft in the axial direction of the shaft, being pushed by the radially extending portion of the shaft in the axial direction of the shaft.

4. The according to claim 3, wherein the support member includes a recess formed therein,
when the shaft rotates from the second rotation position to a third rotational position after the radially extending portion has pushed one of the opening side support member and the closing side support member, the recess preventing the radially extending portion of the shaft from interfering the other of the opening side support member and the closing side support member.

5. The apparatus according to claim 4, wherein the fourth cam surface of the fixed member includes a convex portion most convex in the axial direction of the shaft, a concave portion more concave in the axial direction of the shaft, and an intermediate portion located between the convex portion and the concave portion in a rotational direction of the shaft, a first connecting surface connecting the concave portion and the intermediate portion, a second connecting surface connecting the intermediate portion and the convex portion, and a third connecting surface connecting the convex portion and the concave portion,
the first connecting surface obliquely extending from the concave portion to the intermediate portion in the rotational direction of the shaft and the direction in which the knob pushes the shaft, the second connecting surface extending from the intermediate portion to the convex portion only in the direction in which the knob pushes the shaft, the third connecting surface obliquely extending from the convex portion to the concave portion in the rotational direction of the shaft and in a direction opposite the direction in which the knob pushes the shaft,
the shaft including a fourth rotational position between the first rotational position and the second rotational position,
when a knob side tip of the third cam surface is positioned at the concave portion of the fourth cam surface, the shaft being positioned at the first rotational position,
when the knob side tip of the third cam surface is positioned at the third connecting surface of the fourth cam surface, the shaft being positioned at the second rotational position,
when the knob side tip of the third cam surface is positioned at the intermediate portion of the fourth cam surface, the shaft being positioned at the fourth rotational position.

6. The apparatus according to claim 1, wherein the first rotational position and the third rotational position of the shaft are in diametrically opposed positions to each other.

7. The apparatus according to claim 2, wherein the first rotational position and the third rotational position of the shaft are in diametrically opposed positions to each other.

* * * * *

UNITED STATES PATENT AND TRADEMARK OFFICE
CERTIFICATE OF CORRECTION

PATENT NO. : 7,464,625 B2
APPLICATION NO. : 11/797284
DATED : December 16, 2008
INVENTOR(S) : Keizo Sugiura et al.

It is certified that error appears in the above-identified patent and that said Letters Patent is hereby corrected as shown below:

| Column | Line | |
|---|---|---|
| 4 | 6 | After "interfering" insert --with--. |
| 5 | 49 | Change "has rode over" to --has ridden over--. |
| 5 | 59 | Change "rode over the covex" to --ridden over the convex--. |
| 7 | 20 | Change "fist" to --first--. |
| 9 | 5 | After "example," delete "by". |
| 9 | 10 | Change "by a arm" to --by an arm--. |
| 10 | 42 | Change "the the spring" to --the spring--. |
| 10 | 43 | Change "form one" to --from one--. |
| 12 | 9 | Change "rode over" to --ridden over--. |
| 13 | 62 | Change "rode over" to --ridden over--. |
| 13 | 65 | Change "rode over" to --ridden over--. |

UNITED STATES PATENT AND TRADEMARK OFFICE
CERTIFICATE OF CORRECTION

PATENT NO. : 7,464,625 B2
APPLICATION NO. : 11/797284
DATED : December 16, 2008
INVENTOR(S) : Keizo Sugiura et al.

It is certified that error appears in the above-identified patent and that said Letters Patent is hereby corrected as shown below:

| Column | Line | |
|---|---|---|
| 16 | 24 | Change "rotation" to --rotational--. |
| 16 | 30 | Change "rotation" to --rotational--. |
| 17 | 22 | Change "rotation" to --rotational--. |
| 17 | 28 | Change "rotation" to --rotational--. |
| 17 | 36 | Before "the other" delete "said". |
| 18 | 9 | Change "The according" to --The apparatus according--. |
| 18 | 11 | Change "rotation" to --rotational--. |
| 18 | 16 | After "interfering" insert --with--. |

Signed and Sealed this

Eleventh Day of August, 2009

David J. Kappos
*Director of the United States Patent and Trademark Office*